(12) United States Patent
Gray

(10) Patent No.: US 8,007,231 B2
(45) Date of Patent: Aug. 30, 2011

(54) FLOWING WATER ENERGY DEVICE

(75) Inventor: Dennis John Gray, Spring, TX (US)

(73) Assignee: Dennis Gray, Spring, TX (US)

( * ) Notice: Subject to any disclaimer, the term of this patent is extended or adjusted under 35 U.S.C. 154(b) by 441 days.

(21) Appl. No.: 12/175,196

(22) Filed: Jul. 17, 2008

(65) Prior Publication Data

US 2010/0013230 A1 Jan. 21, 2010

(51) Int. Cl.
F03B 13/10 (2006.01)

(52) U.S. Cl. ........................ 415/182.1; 290/54

(58) Field of Classification Search ............... 290/54
See application file for complete search history.

(56) References Cited

U.S. PATENT DOCUMENTS

| | | | | |
|---|---|---|---|---|
| 3,644,052 A * | 2/1972 | Lininger | ............................ | 415/7 |
| 3,928,771 A * | 12/1975 | Straumsnes | ..................... | 290/43 |
| 4,142,823 A * | 3/1979 | Nickell | ...................... | 415/182.1 |
| 4,219,304 A * | 8/1980 | Schock | .............................. | 415/7 |
| 4,241,283 A * | 12/1980 | Storer, Sr. | ........................ | 290/54 |
| 4,352,990 A * | 10/1982 | Aucoin, Jr. | ..................... | 290/54 |
| 4,446,378 A * | 5/1984 | Martinez Parra | ............... | 290/54 |
| 5,051,059 A * | 9/1991 | Rademacher | .................... | 415/7 |
| 5,430,332 A * | 7/1995 | Dunn, Jr. | ........................ | 290/54 |
| 7,063,579 B2 | 6/2006 | Voves | | |
| 7,466,035 B1 * | 12/2008 | Srybnik et al. | .................. | 290/43 |
| 2007/0081861 A1 * | 4/2007 | Goble | ............................ | 405/79 |
| 2008/0101865 A1 | 5/2008 | Basteck | | |
| 2008/0231057 A1 * | 9/2008 | Zeuner | ............................ | 290/54 |
| 2009/0309366 A1 * | 12/2009 | Moore | ............................ | 290/53 |
| 2009/0314353 A1 * | 12/2009 | Vasshus et al. | ................. | 137/14 |
| 2010/0109332 A1 * | 5/2010 | Del Valle | ........................ | 290/54 |

* cited by examiner

Primary Examiner — Joseph Waks

(57) ABSTRACT

This device transforms the energy of flowing water into useable energy and includes one or more flow diversion structures, one or more paddlewheels, and one or more generators. A gearbox or transmission may be added to increase the rotational speed of the generators. A subsea cable can be included to transmit the electrical energy from device to shore.

13 Claims, 4 Drawing Sheets

FLOWING WATER ENERGY DEVICE

STATEMENT REGARDING FEDERALLY SPONSORED RESEARCH & DEVELOPMENT

Not Applicable. No others have rights to this patent. Dennis Gray is the sole inventor and the invention was not created under any federally sponsored programs.

NAMES OF THE PARTIES TO A JOINT RESEARCH AGREEMENT

Not applicable. There are no other parties involved in any joint research.

BACKGROUND OF THE INVENTION

Populations grow exponentially, world economies are expanding, demand for energy is escalating, global warming becomes more evident, and fossil fuels are running out. Political tensions regarding hydrocarbons are high to say the least. The United States, and rest of the world, needs solutions to these energy problems and they need them to be clean renewable solutions.

In the Atlantic Ocean off the Southeastern United States runs the Gulf Stream. Essentially, the Gulf Stream is a river of ocean water flowing with an average speed of 4 mph. At its widest point, the Gulf Stream is almost as wide as Florida. This flow of ocean water carries as much energy as the entire world consumes 100 times over, and it flows constantly 24 hrs a day 365 days a year. Similar currents run along the edges of all other continents.

Numerous companies have designed and built devices that convert the energy of flowing water into useable electricity, but such devices tend to consist of traditional turbines. These marine turbines are very similar to common wind turbines but they are designed to be used underwater. Marine turbines have rotating blades that slice through the water, and likewise slice into whales, manatees, dolphins, and other marine animals that may be swimming by. These blade impacts not only injure or kill the animal, but also break the blades of the device and render the marine turbine useless until it is repaired. When traditional marine turbines are used in flowing rivers they are not only susceptible to catastrophic damage by animal impacts, but by debris such as tree branches that drift downstream. Solutions to these problems are virtually impossible to find because screening the water flow ahead of such turbines ultimately blocks the energy itself. Any screen would soon get clogged with seaweed and marine growth in a very short period of time. A new approach was deemed necessary and the invention herein provides the solutions.

To be viable, a device that converts the energy of flowing water into useable energy must not harm marine life. The device must also be very strong and robust to survive punishing river and ocean environments. Traditional turbine blades must inherently be hydrodynamically efficient, and thus cannot be thick, strong, and robust as required.

To be reliable, a device that converts energy from flowing water cannot be complex. Sophisticated components should be avoided and all critical components must be well protected from the harsh wet conditions. An uncomplicated design will also ensure capital, operating, and maintenance costs associated with the device will be very low. When costs are low enough, the resulting cost per kilowatt hour can match that of fossil fuels.

Ideally, a device that converts energy from flowing water should also be capable of being scaled up to enormous size without requiring an array, or vast quantities, of such devices. Many devices in an array only results in hundreds, if not thousands, of components needing to be maintained. Spread out amongst the array, even simple components will be difficult to maintain if they are distributed out over several square miles. An ideal device would still have an extremely low number of components even when scale up and sized to produce 100 s, if not 1000 s, of megawatts. Finally, an ideal device would not be affected by hurricanes nor typhoons that might pass by. The novel invention described herein delivers on every single objective mentioned in the paragraphs above.

Upon review of all similar innovations, one will find that prior art has addressed only a few of the necessary requirements. Without addressing all of them, such a device cannot produce power both safely and cost-effectively. Particular features not found in prior inventions make this particular invention considerably more viable, practical, economical, cost-effective, and harmless to underwater environments.

BRIEF SUMMARY OF THE INVENTION

The purpose of this invention is to safely, efficiently, and cost effectively transform the energy of moving water into useful electrical energy and do so with virtually no impact to underwater environments. The novelty and effectiveness of this invention is primarily due to several beneficial features described below. First, this invention permits animals such as dolphins, manatees and whales to safely swim directly through the invention unharmed, unlike traditional marine current turbines which have blades that slice through the water and impact animals. Secondly, just one of these devices can be scaled up to enormous size without creating an array of these devices. Arrays of devices result in excessive components, high maintenance, and considerably higher costs. This innovation can be scaled so large that it can match the power output of the largest hydroelectric plants ever installed. Even at enormous size this invention still contains the same low number of components that a scale model of the device contains.

This invention, due to the remarkably low number of components and the selection of components that perform well under water, can be operated and maintained at extremely low costs. The design of this invention ensures that capital costs are very low and reliability is extremely high. The critical components in this invention are 100% protected from water contact which keeps maintenance costs negligible. Great care has been taken to ensure that installation costs associated with this invention are very low due to the types of components selected and the use of modular construction methods. As a result of the unique features described above, this invention produces energy at extremely low costs and does so with virtually no impact to the environment. Much of the invention can be constructed 50 ft or more below water surface level to ensure that hurricanes and typhoons will have no detrimental impact on the device whatsoever. Power can be extracted 24 hrs a day 365 days a year even when currents, or water flow, is just 1 knot or less because components within the invention accelerate the flowing water to higher speeds. Since only very low water speeds are required, this invention can be utilized off the coasts of every continent.

In essence, the invention consists of at least one or more flow diversion structures, one or more paddle wheels, one or more bearings or bushings about which the paddle wheel spins, and a shaft that transmits the rotational energy from the spinning paddle wheel to either a generator, or transmission and generator combination. In the preferred embodiment, a subsea cable delivers the electrical energy from the generator to shore.

DESCRIPTION OF THE PREFERRED EMBODIMENT

Figure 1:
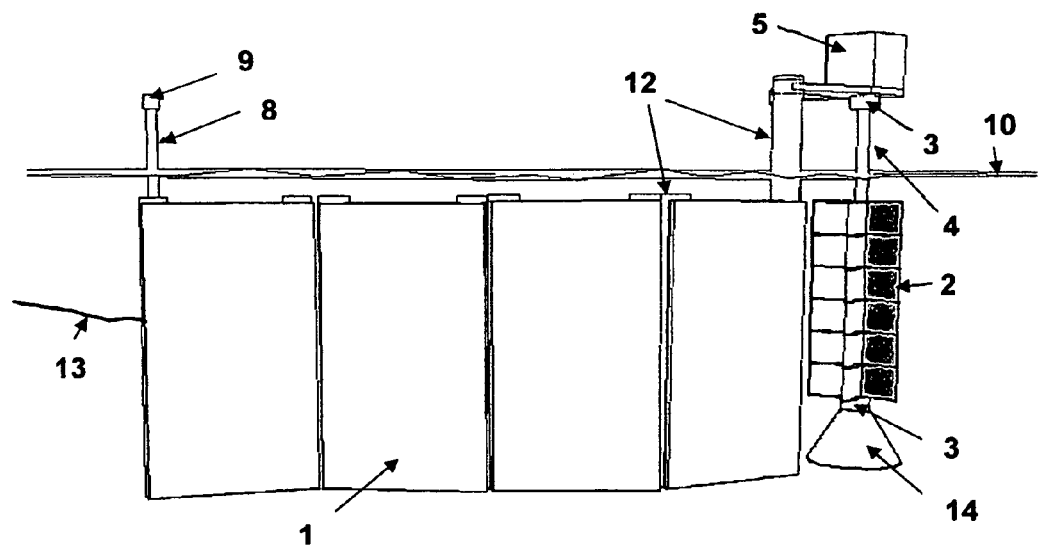
FIG. 1 is a side view of a preferred embodiment of the invention.

The eight figures illustrate a preferred embodiment of this invention. The invention can be designed and scaled for any water depth, current width, and power output requirement. A preferred embodiment would primarily be constructed of painted steel and other suitable marine grade materials. Components of the device include one or more flow diversion structures (1) installed upstream from a paddle wheel (2) which rotates about bushings and/or bearings (3) when water is flowing near the flow diversion structure. When water is flowing near the flow diversion structure the water is accelerated, and this faster moving water causes the paddle wheel to rotate, which in turn rotates a shaft (4), which in turn drives a generator located in the generator room (5). In a preferred embodiment, the generator would be a large diameter annular generator so that a gearbox or transmission would not be necessary. However, a transmission can be installed and placed between the paddle wheel shaft and the generator. This optional item increases the speed of the shaft that enters the generator. Most generator types operate more efficiently when spinning at higher speeds.

Figure 2:
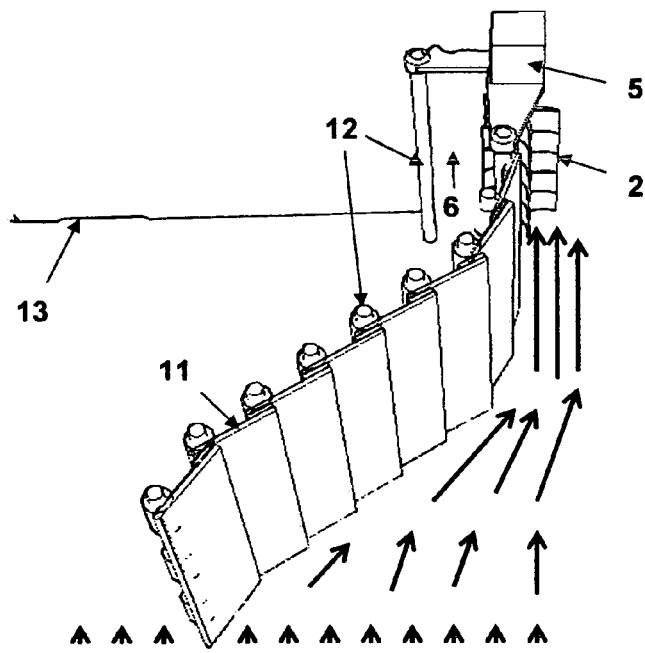
FIG. 2 is an isometric plan view of a preferred embodiment of the invention.
Figure 3:
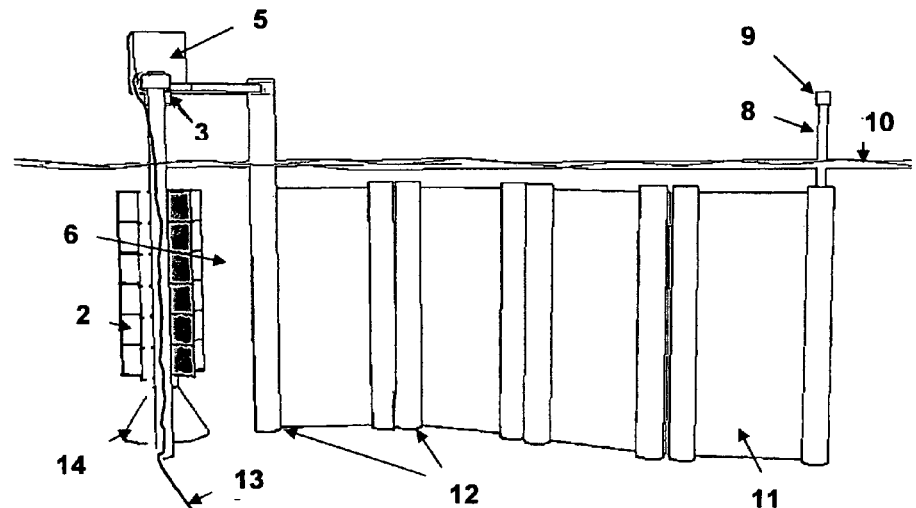
FIG. 3 is a side view of a preferred embodiment showing the back side of the flow diversion structure.
Figure 4:
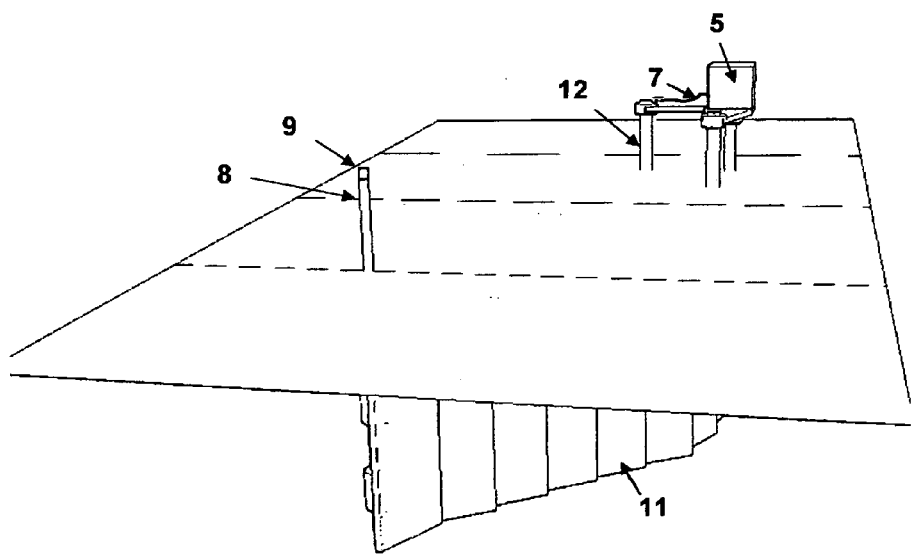
FIG. 4 is an isometric plan view of a preferred embodiment showing the components above water level.

It is important to note that the flow diversion structure (1) and paddle wheel (2) are spaced (6) sufficiently far apart from one another to avoid any pinch points for marine animals that may be in the vicinity. This deliberate spacing (6) is best displayed in FIGS. 2, 3 and 5. In a preferred embodiment the spacing between these components is large enough to permit even the largest of whales to pass through the spaces. Fish, dolphins, manatees, whales, and other marine life swimming by this invention are likely moving at similar speeds as the flowing water itself and in the same direction as the moving water. Thus, these animals will not likely do more than just brush against a paddle of the paddle wheel. Due to centripetal forces, animals and objects near the paddle wheel are inherently propelled away from the paddles. The tips/edges of paddles on the paddle wheel, as well as the edges of flow diversion structure, can consist of soft flexible materials to ensure any contact with marine animals is a soft contact and does not injure the animals. Despite the safety features that result from the above mentioned design features, the paddles are moving so slowly that they will be virtually harmless to marine life that comes in contact with them. It is not the speed of the paddle wheel that generates enormous amounts of energy, but the size and power of the water behind the paddles that results in the staggering amounts of energy.

Paddles, unlike typical turbine blades, can more easily be built strong enough to withstand impacts by debris or marine animals that may drift through the flowing water because hydrodynamic efficiency is not as great of concern with paddles. The incredible efficiency of this device is not achieved via the use of paddles vs. turbine blades because paddles are known to be less efficient that turbine blades. The incredible efficiency is a result of the shear size of the device that can be created in comparison with traditional marine turbines as well as the acceleration of water that results from the installation of one or more flow diversion structures. The use of flow diversion structures with traditional marine turbines would funnel marine life directly into the dangerous slicing blades and is therefore not a viable addition. Prior art using paddle wheels were floating systems where the paddle wheels were only partially submerged at water level leaving them highly vulnerable to storms. The novel invention herein utilizes flow diversion structures in combination with paddlewheels which enable the paddle wheels to be highly productive despite being fully submerged under water, and therefore safe from storms.

The clearance between water level and most components of the invention ensures that storms such as hurricanes and typhoons do no effect the device, nor the power output of the device. The only components that likely extend above the water surface are the legs of the platform structure (7), the generator room (5) that is mounted on top of the platform structure, and the structural cylinder (8) with navigational beacon light (9) which would likely mark the other end of the device. In a preferred embodiment, lights are installed on all items that extend above the water surface to notify ships of their location at night and in fog. Nevertheless, this invention would most likely be installed far from shipping lanes.

In an alternative embodiment, the generator room (5) can remain at an elevation well below water level (10). In this case there would likely be passage ways for air intake, air outflow, and manway passage to the generator room. In a preferred embodiment, however, the generator room is above mean water level and consists of a windowless steel or concrete room to protect the generator and any other power processing equipment that may be housed inside the generator room from storms. In an alternative embodiment, the three passage ways that extend out of the water would likely be constructed of robust cylinders made from thick steel plate and these cylinders would be trussed together much like the triangular leg of a jack-up oil rig. To clarify, the air intake passage would likely permit air flow into and around the generator for cooling. The air outflow passage would likely permit heated air to exit the generator room (5). Finally, a manway passage would likely permit a person to climb down into the generator room (5) to perform maintenance and repairs as necessary. Despite extending well into the sky to ensure the largest of storm waves would not wash over and into passage ways, all three passages would likely include watertight hatches to provide redundant protection from water intrusion. In an alternative embodiment, flow diversion structures may be installed both horizontally and vertically to accelerate the water in both horizontal and vertical directions.

Figure 5:
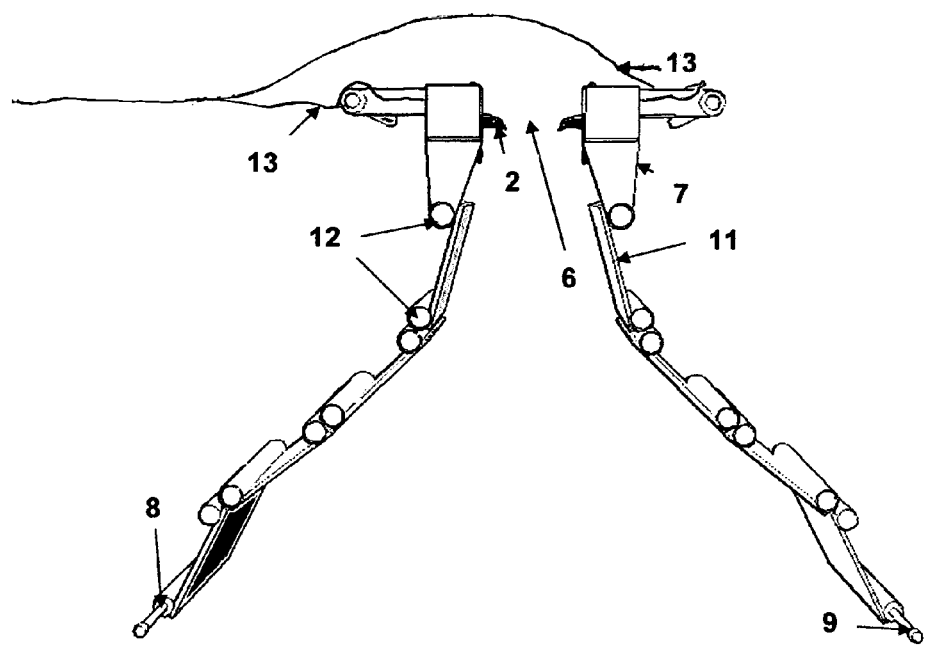
FIG. 5 is a plan view showing two preferred embodiments of the invention as to create a funnel or nozzle.
Figure 6:
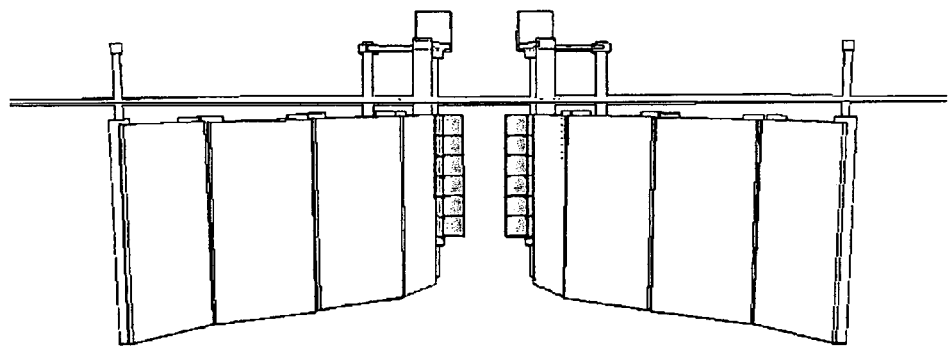
FIG. 6 is an elevation view showing two preferred embodiments of the invention side by side.
Figure 7:
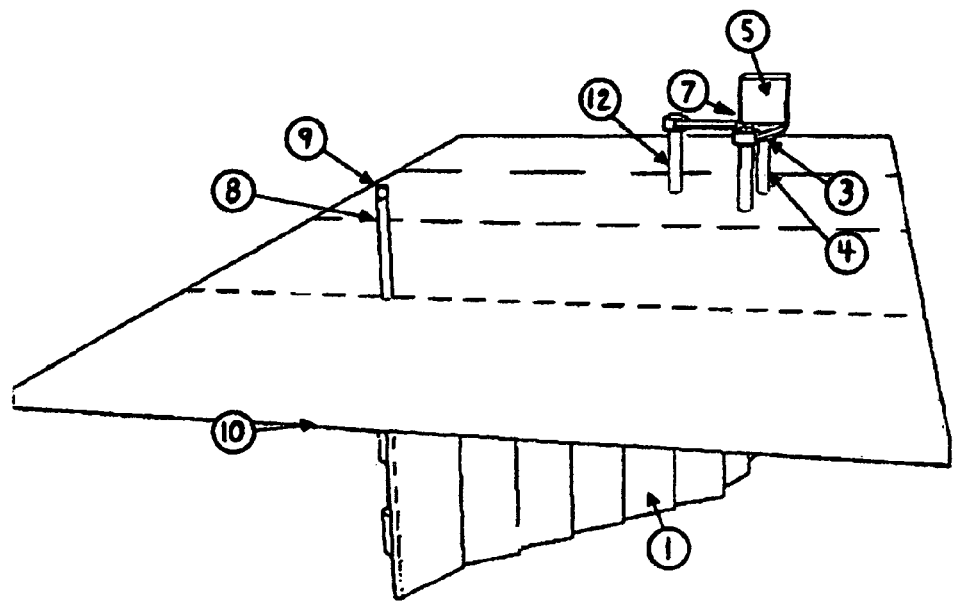
FIG. 7 is an isometric plan view showing the water plane level.
Figure 8:
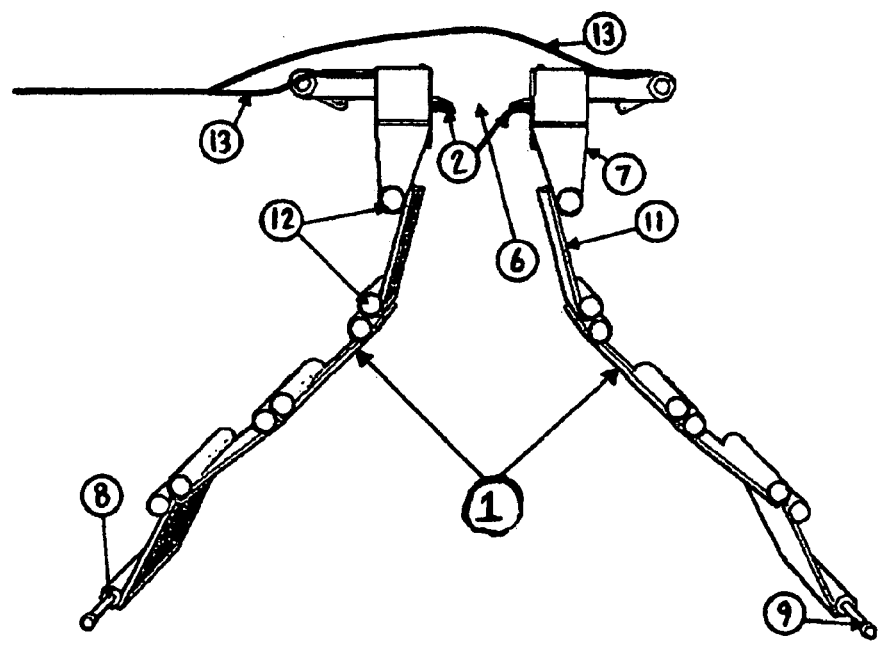
FIG. 8 is a plan view showing the multiple paddlewheels and multiple flow diversion walls.

At five to ten miles out, this invention would not likely be visible from shore. All critical components are enclosed and protected from the harsh wet environment. Bushings or bearings (3) can be fully sealed and the generator is completely enclosed within the generator room (5). In a preferred embodiment, the bushings/bearings (3) likely consist of steel ball bearings or nylatron materials. The flow diversion structure (1) is modular in construction in a preferred embodiment. A flow diversion structure would likely be made up of structural steel panels (11) that span between suction piles (12) at each panel end. One at a time, each panel of a flow diversion structure could be installed with its suction piles (12) anchored deep into the seabed. Note that the generator platform structure (7) atop its own piles (12) would likely be installed before the one or more flow diversion structures (1). This sequence is preferred since it avoids higher currents that result at the platform (7) and paddle wheel (2) locations if the flow diversion structure were to be installed first. Finally, a subsea cable (13) would be included in the preferred embodiment to bring the electrical power from generator and generator room (5) to shore. As shown in FIGS. 5 and 6, one or more of these inventions may be installed together. This would improve efficiency by creating a funnel or nozzle to the paddle wheels, but it eliminates the possibility that animals such as whales could swerve very far left or very far right of this device to avoid a paddle wheel altogether. The more efficient funnel structure could essentially trap the marine animals down a destined path, and is thus may not be the preferred embodiment.

In a preferred embodiment, the generator room (5) also encloses power processing equipment and transformers to boost power voltage prior to sending it down the subsea cable (13) to shore. The generator room is likely windowless, climate controlled, and de-humidified to create and ideal environment for electrical equipment. A robust windowless construction also ensures it can withstand hurricane storm forces. The platform structure (5) is located far above water level (10) in a preferred embodiment to elevate it above storm surge and highest waves that occur in severe storm conditions. A funnel shaped structure (14) may be added around the base of the paddle wheel to divert oncoming marine animals from the pile supporting the paddle wheel.

In an alternative embodiment, the paddles of the paddle wheel can articulate, bend, pivot, or increase/decrease in size depending upon their location in the circle of motion of the paddle wheel. For example, when paddles are in the location of highest/fastest flow, or more useful flow, the paddles could automatically extend out to better capture this useful flow, yet retract when paddles later move to rotational locations of less useful flow. This would increase paddle productivity when extended, and reduce paddle resistance when retracted. In an alternative embodiment, mechanisms could be installed to automatically articulate the paddles or change their extended lengths during the rotation of a paddle wheel, which in turn would increase the device efficiency. However, the added complexity and maintenance required in such paddle extension/retraction systems may outweigh the benefits of the improved efficiency provided by them. Paddles can simply pivot about an axis and be backed at their edge by a structural member to create high cross sectional areas with oncoming flow, and pivot away into a flagging position with hardly any cross sectional area in the direction of oncoming flow when flows are not coming from useful directions. These modifications may or may not provide efficiency benefits that outweigh maintenance drawbacks they may provide. Nevertheless, these alternative embodiments are included and covered by the claims presented in this patent application.

The invention claimed is:

1. A device for transforming the energy of moving water into useable energy comprising one or more flow diversion structures, and one or more paddle wheels, whereby one or more flow diversion structures and one or more paddle wheels are submerged, and whereby one or more flow diversion structures and one or more paddle wheels are spaced sufficiently far apart from one another resulting in improved safety for marine life, and one or more shafts, and one or more bushings or bearings, and one or more generators which convert the rotational energy transmitted through one or more shafts into useable electricity.

2. The device of claim 1 whereby one or more transmissions or gearboxes are included which results in improved rotational speed of one or more generators.

3. The device of claim 1 whereby one or more paddles of one or more paddle wheels have flexible or soft tips.

4. The device of claim 1 whereby the trailing edge or leading edge of one or more flow diversion structures have flexible or soft tips.

5. The device of claim 1 whereby the width or height of one or more paddles of one or more paddle wheels is made adjustable in size resulting in improved energy extraction when the direction of flow relative to one or more paddles is more useful, and resulting in decreased drag when the direction of flow relative to one or more paddles is less useful.

6. The device of claim 1 whereby one or more paddles can pivot, or partially pivot, to create increased cross-sectional area against the direction of water flow when the direction of flow relative to one or more paddles is more useful, and pivot, or partially pivot, to create less cross-sectional area against the direction of water flow when the direction of flow relative to one or more paddles is less useful.

7. The device of claim 1 whereby one or more subsea cables is included resulting in the transportation of energy from the device to shore.

8. The device of claim 1 whereby navigational warning equipment is included on or near the device to alert ships to the location of said water flow energy device.

9. A device for transforming the energy of moving water into useable energy comprising one or more flow diversion structures, and one or more paddle wheels, whereby one or more flow diversion structures and one or more paddle wheels are at least primarily submerged, and whereby one or more flow diversion structures and one or more paddle wheels are spaced sufficiently far apart from one another resulting in improved safety for marine life, and one or more shafts, and one or more bushings or bearings, and one or more generators which convert the rotational energy transmitted through one or more shafts into useable electricity.

10. The device of claim 9 whereby one or more transmissions or gearboxes are included resulting in the improved rotational speed of one or more generators.

11. The device of claim 9 whereby the trailing edge of one or more flow diversion structures, the leading edge of one or more flow diversion structures, or one or more paddle edges have flexible or soft tips.

12. The device of claim 9 whereby one or more paddles of one or more paddle wheels can be made adjustable in size, or pivot, or partially pivot, resulting in increased cross-sectional area against the direction of water flow when the direction of flow relative to one or more paddles is more useful, and adjust in size, or pivot, or partially pivot, to decrease cross-sectional area against the direction of water flow when the direction of flow relative to one or more paddles is less useful.

13. The device of claim 9 whereby one or more subsea cables is included resulting in the transportation of energy from the device to shore.

* * * * *